(12) United States Patent
Timis

(10) Patent No.: US 11,881,600 B2
(45) Date of Patent: Jan. 23, 2024

(54) FUSE BOX ON A VEHICLE BATTERY AND METHOD FOR MOUNTING A FUSE BOX ON A VEHICLE BATTERY

(71) Applicant: Volvo Car Corporation, Gothenburg (SE)

(72) Inventor: Adrian Timis, Kungälv (SE)

(73) Assignee: VOLVO CAR CORPORATION, Gothenburg (SE)

(*) Notice: Subject to any disclaimer, the term of this patent is extended or adjusted under 35 U.S.C. 154(b) by 202 days.

(21) Appl. No.: 17/380,783

(22) Filed: Jul. 20, 2021

(65) Prior Publication Data
US 2022/0029255 A1 Jan. 27, 2022

(30) Foreign Application Priority Data
Jul. 23, 2020 (EP) .................................. 20187473

(51) Int. Cl.
H02G 3/08 (2006.01)
H01M 50/581 (2021.01)
B60L 1/00 (2006.01)

(52) U.S. Cl.
CPC ............. *H01M 50/581* (2021.01); *B60L 1/00* (2013.01); *H02G 3/081* (2013.01); *H01M 2200/103* (2013.01); *H01M 2220/20* (2013.01)

(58) Field of Classification Search
CPC ............ H02G 3/08; H02G 3/081; H02G 3/14; H02G 3/086; B60R 16/02; B60R 16/03; B60R 16/023; B60R 16/0238; H01H 85/044; H01H 85/20; H01H 85/02; H01H 85/165; H01H 85/2045; H01M 50/244; H01M 50/249; H01M 50/271; H01M 50/574; H01M 50/581; H01M 2220/20; H05K 5/00; H05K 5/02; H05K 5/0004; B60L 1/00
USPC ............... 174/50, 520, 66, 67, 559, 560, 59; 439/76.1, 76.2, 949; 361/600, 601, 641, 361/679.01
See application file for complete search history.

(56) References Cited

U.S. PATENT DOCUMENTS 6,723,920 B2   4/2004   Higuchi et al.
6,948,982 B2   9/2005   Higuchi et al.
(Continued)

FOREIGN PATENT DOCUMENTS

CN   105575741 A   5/2016
CN   109546014 A   3/2019
(Continued)

OTHER PUBLICATIONS

Extended European Search Report received for European Patent Application Serial No. 20187473.2 dated Jan. 19, 2021, 7 pages.

*Primary Examiner* — Angel R Estrada
(74) *Attorney, Agent, or Firm* — Amin, Turocy & Watson, LLP

(57) ABSTRACT

The current disclosure relates to a method for mounting a fuse box associated with a vehicle battery. In one example, the method can comprise providing a battery comprising a housing and a cover closing off an opening of the battery housing. The method can further comprise providing at least one fastening member can be provided for mounting the fuse box to the cover. The method can further comprise cutting thread in the cover for providing a threaded hole. The method can further comprise screwing the fastening member into the threaded hole.

16 Claims, 2 Drawing Sheets

(56) References Cited

U.S. PATENT DOCUMENTS

| | | | |
|---|---|---|---|
| 7,046,115 B2 | 5/2006 | Higuchi et al. | |
| 9,265,164 B2 * | 2/2016 | Darr | H02G 3/10 |
| 10,269,522 B2 * | 4/2019 | Kitano | H01M 50/567 |
| 10,770,876 B2 * | 9/2020 | Yoshida | H02G 3/081 |
| 11,139,135 B2 * | 10/2021 | Yamaguchi | H01M 50/583 |
| 11,145,926 B2 * | 10/2021 | Kim | H01M 50/262 |
| 11,165,233 B2 * | 11/2021 | Ohtsuka | H02G 3/088 |
| 11,508,543 B2 * | 11/2022 | Kwon | H01H 85/0241 |
| 11,509,077 B2 * | 11/2022 | Yamaguchi | H01H 85/25 |
| 2014/0017529 A1 | 1/2014 | Matsumoto | |
| 2014/0192457 A1 * | 7/2014 | Zhao | B60R 16/0238 |
| | | | 361/624 |
| 2017/0345601 A1 | 11/2017 | Kitano et al. | |

FOREIGN PATENT DOCUMENTS

| | | |
|---|---|---|
| CN | 111183532 A | 5/2020 |
| DE | 102017206650 A1 | 10/2018 |
| KR | 10-0755031 B1 | 9/2007 |
| KR | 20-0436538 Y1 | 9/2007 |
| WO | 97/40510 A1 | 10/1997 |
| WO | 2013/008460 A1 | 1/2013 |
| WO | 2014/109922 A1 | 7/2014 |
| WO | 2019/179614 A1 | 9/2019 |

\* cited by examiner

FUSE BOX ON A VEHICLE BATTERY AND METHOD FOR MOUNTING A FUSE BOX ON A VEHICLE BATTERY

CROSS-REFERENCE TO RELATED APPLICATIONS

This application claims priority to EP patent application no. 20187473.2 filed on Jul. 23, 2020; and entitled "Method for mounting a fuse box on a vehicle battery." The entirety of the aforementioned application is hereby incorporated herein by reference.

TECHNICAL FIELD

The present disclosure relates to a method for mounting a fuse box associated with a vehicle battery.

BACKGROUND ART

Fixation of a 12 volt (V) battery fuse box to a 12V battery is currently based mainly on the use of additional brackets or dependent on the surroundings that can be formed by e.g. a battery box or a battery tray. These solutions to mount a fuse box with respect to a battery take up a lot of space in a cramped vehicle interior. Another known solution is to have a fuse box clipped to the top cover of the 12V battery either with one bracket or additional brackets. Also, it is known to mount a fuse box on a battery pole. This will introduce mechanical stress with respect to the pole.

Existing fixation solutions either take a lot of space or are too expensive. They require support around the battery and sometimes are not robust enough to protect the plus pole of the battery. They are hard to assemble in the factory and difficult to service during product life.

SUMMARY

The 12V battery has different sizes and mounting locations in different vehicles with different environments and spaces around it. The 12V battery has 2 standard holes with 5 mm diameters that are currently used for mounting a temporary plastic cover to the plus pole and minus poles of the battery. All H type batteries have these standard holes conform a European Standard EN 50342-2:2007.

The present disclosure provides a method for mounting a fuse box with a vehicle battery. The method can comprise providing a vehicle battery comprising a housing and a cover closing off an opening of the housing. The method can further comprise providing a fastening member for mounting the fuse box to the cover. The method can further comprise providing thread in the cover forming a threaded hole. The method can further comprise screwing the fastening member into the threaded hole to connect the fuse box and the vehicle battery.

Providing thread in the cover for providing a threaded hole, and screwing the fastening member into the threaded hole for providing a threaded connection between the fuse box and the vehicle battery results in a fast, cheap and reliable threaded connection between the fuse box and the battery. Moreover, the method allows to position the fuse box on top of the battery without requiring any free space around the battery during mounting of the fuse box on top of the battery. It will be clear that the method steps can be carried out by a person and/or a robotic system depending on the circumstances.

In other words, the advantages of this solution are that the mounting of the fuse box is independent of the surroundings around the battery, and being reliant only on the 12V battery itself for its fixation. The solution is cheap and does not involve expensive tooling for the plastic part or any additional tooling. The solution is applicable to all sizes of H type batteries and therefore a common standardized fuse box can be used for several projects without further requirements for the surroundings to achieve fixation.

The cover closing off an opening of the battery housing functions to separate battery chemistry from an exterior of the battery. This means that a minimum wall thickness of the cover needs to be maintained while cutting the thread in the cover. An example of a minimum wall thickness is a thickness between 1.6 to 2.0 millimeter (mm) for a cover of a standard H type 12 V vehicle battery. It will be clear that the minimum wall thickness can differ depending on the type and construction of the battery.

In an embodiment of the method, providing thread in the cover comprises cutting thread directly in the cover for providing the threaded hole. This results even more in a fast, cheap and reliable connection between the fuse box and the battery, and reduces the number of parts. It is important to respect a minimum wall thickness while cutting the thread. A typical depth of thread is less than about 0.5 mm.

In an embodiment of the method, the fastening member comprises a cutting means and the cutting thread comprises performing a cutting action with the cutting means of the fastening member to the cover. This results even more in a fast connection between the fuse box and the battery since a separate step of cutting thread in the cover is omitted.

In an embodiment of the method, the cover comprises a blind recess, and the step of cutting thread comprises cutting thread in the recess for providing the threaded hole. The already present blind recess even more results in a reliable connection between the fuse box and the battery since the blind recess enables to cut thread along an entire height of the blind recess. To avoid puncturing of the battery cover, a minimum portion of the height of the recess is not provided with thread, for example a minimum portion of 2 mm in case of a recess height of 14 mm.

In an embodiment, the method comprises clamping a terminal on a battery pole. The additional connection between the terminal of the fuse box and the battery pole contributes to the already fast, cheap and reliable connection between the fuse box and the battery.

In an embodiment, the method comprises engaging the terminal and the battery pole with a loose fit, and screwing the fastening member into the threaded hole before clamping the terminal on the battery pole. Engaging the terminal and the battery pole with a loose fit, allows avoiding mechanical stress on the battery pole and its fit to the battery.

In an embodiment, the method comprises arranging the fuse box on top of the battery wherein a projection of the fuse box is within an outline of the battery. This arrangement of the fuse box on top of the battery does not require any free space around the battery during mounting of the fuse box on top of the battery.

In an embodiment of the method, the recess comprises a pair of blind holes that is normally used to connect a temporary battery pole cover to, and wherein the method comprises removing the battery pole cover from the battery before connecting the fuse box to the blind holes. Removing the battery pole cover just before cutting thread, ensures a clean pair of blind holes before making the threaded connection between the fuse box and the cover. In addition, the pair of blind holes enables to make use of them both and will result in an even more reliable connection between the fuse box and the battery. Where normally a pair of blind holes is used to connect a temporary battery pole cover to the battery, it will be clear that any other suitable number of holes is conceivable.

In an embodiment of the method, the fastening member comprises a thread cutting screw, in particular a type PF6 screw, and/or a threaded insert, and wherein when the fastening member comprises the threaded insert, the providing thread in the cover comprises arranging the threaded insert in the blind recess. The fastening member comprising a threaded insert enables to have a more reliable and clean way of providing thread in the cover for providing the threaded hole. The fastening being a type PF6 screw is merely an example. It will be clear that any suitable type of thread cutting screw is conceivable.

The present disclosure provides a fuse box for use in a method. The method can comprise providing a vehicle battery comprising a housing and a cover closing off an opening of the housing. The method can further comprise providing a fastening member for mounting the fuse box to the cover. The method can further comprise providing thread in the cover forming a threaded hole. The method can further comprise screwing the fastening member into the threaded hole to connect the fuse box and the vehicle battery. The fuse box can comprise a means for coupling a fastener to the fuse box and a terminal for clamping around a battery pole. The fastener can comprise a cutting means for cutting thread.

This fuse box allows for a fast, cheap and reliable connection between the fuse box and a battery. Moreover, the method allows positioning the fuse box on top of the battery without requiring any free space around the battery during mounting of the fuse box on top of the battery.

In an embodiment, the fuse box comprises a resilient fuse box section, wherein the fastener and the terminal are connected to the resilient fuse box section to allow adjustment of a spacing between the fastener and the terminal within an adjustment window of operation, wherein the adjustment window of operation is determined by the resilient fuse box section. The obtained adjustment window of operation, avoids mechanical stress to the battery pole and its fit to the battery.

The present disclosure provides an assembly of a battery and a fuse box as described above.

In an embodiment of the assembly, the fuse box is connected to the battery through a threaded connection between a battery cover and the fuse box and a clamping action between a fuse box terminal and a battery pole. The clamping action between the fuse box terminal and the battery pole contributes to the fast, cheap and reliable threaded connection between the fuse box and the battery.

In an embodiment of the assembly, the fuse box is arranged on top of the battery and wherein a projection of the fuse box is within an outline of the battery. The fuse box being arranged on top of the battery and wherein a projection of the fuse box is within an outline of the battery assures that free space around the battery is not required during mounting of the fuse box on top of the battery.

BRIEF DESCRIPTION OF THE DRAWINGS

The present disclosure will be discussed in more detail below, with reference to the attached drawings, in which.

DESCRIPTION OF EMBODIMENTS

Figure 1:
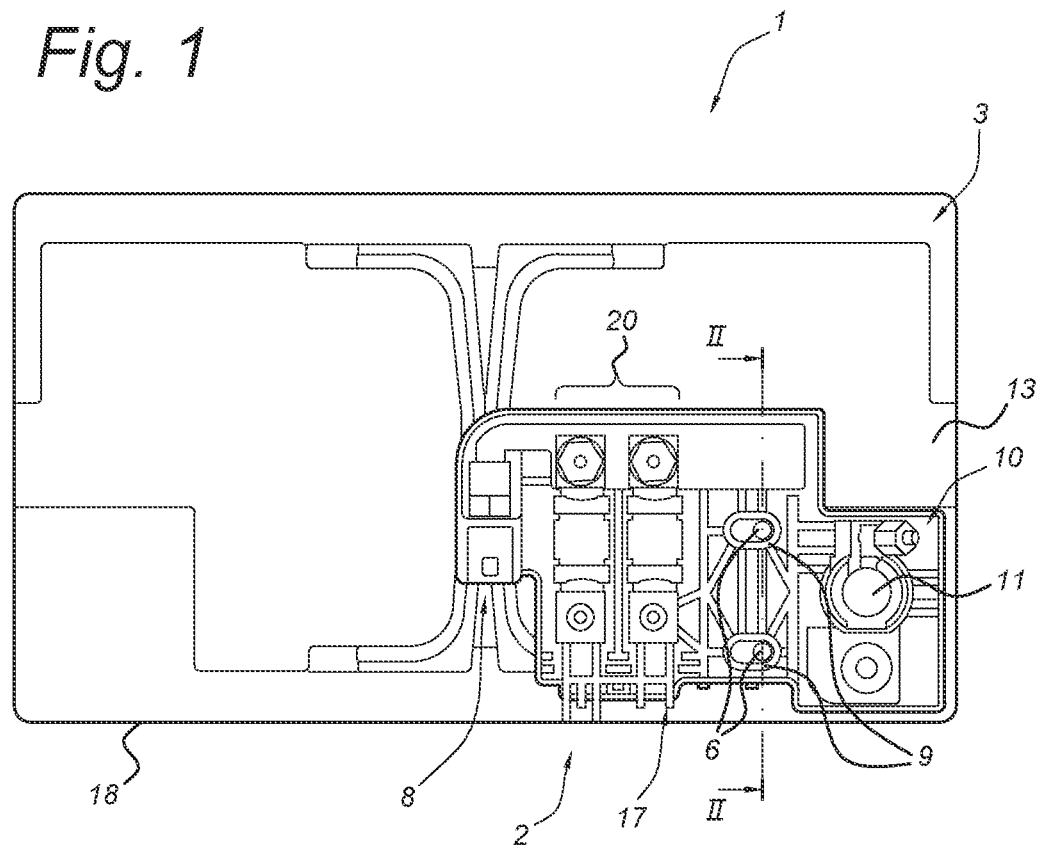
FIG. 1 is a top view of an assembly according to the disclosure of a battery with a fuse box mounted on top thereof. The two locations for the fasteners, e.g., PF6 screws, are encircled with a red oval shaped contour.

FIG. 1 is a top view of an assembly 1 according to the disclosure of a battery 3 with a fuse box 2 mounted on top of the battery 3. The fuse box 2 connects to a battery pole 11. The fuse box 2 comprises a terminal 10 and the fuse box 2 connects to the battery pole 11 through the terminal 10. The terminal 10 clamps around the pole 11. The fuse box 2 comprises a connector means 8 to connect the fuse box to the electrical system of the vehicle. The connector means 8 connects to the terminal 10 through a fuse system 20. In this case, the battery 3 is a H type 12 V battery. The shown battery conforms to the European Standard EN 50342-2: 2007. This European Standard is applicable to lead-acid batteries used for starting, lighting and ignition of passenger automobiles and light commercial vehicles with a nominal voltage of 12 V. The battery 3 comprises a housing 18 and a cover 13. The cover 13 closes off a top opening of the battery housing 18. Here, a projection of the fuse box 2 is within an outline of the battery 3. This arrangement of the fuse box 2 on top of the battery 3 does not require any free space around the battery during mounting of the fuse box 2 on top of the battery 3. Two cut outs 9 are provided in a bottom plate member 17 of the fuse box 2. The cut outs 9 are configured for receiving respective fasteners 6 and function as means for coupling the fastener 6 to the fuse box 2. The interior of the fuse box 2 is normally closed off by a fuse box cover that is not shown here.

Figure 2:
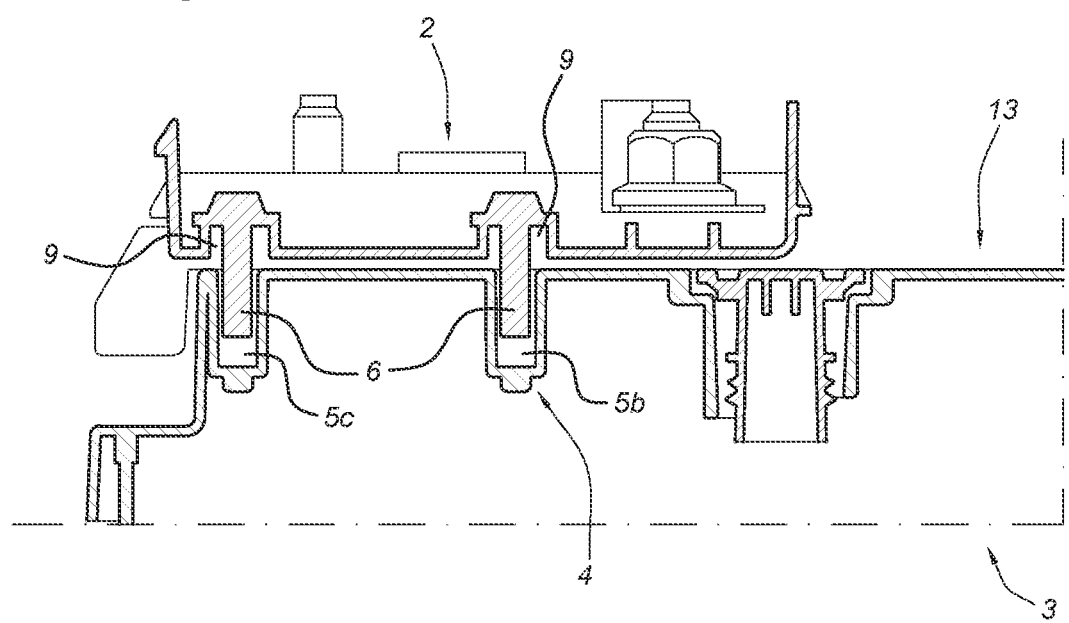
FIG. 2 is a cross sectional side view of a detail of the assembly of FIG. 1.

FIG. 2 is a cross sectional side view of a detail of the assembly 1 of FIG. 1. The cover comprises a blind recess 4. Here, the blind recess 4 comprises two blind holes 5a, 5b. This pair of blind holes 5a, 5b are normally used to connect a temporary battery pole cover (not shown) to. Before mounting the fuse box 2 to the battery cover 13 the battery pole cover is removed from the battery 3. The fasteners 6 extend through the cut outs 9 and are in threaded connection with the battery cover 13. In addition, and best shown in FIG. 1, the fuse box 2 comprises a clamping terminal 10 for clamping on a battery pole 11.

Figure 3A:
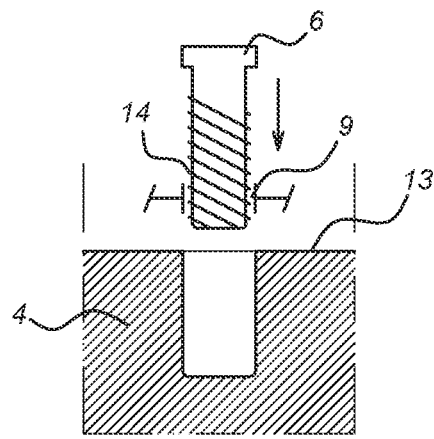
FIGS. 3A and 3B show details of a first embodiment of a method according to the disclosure for mounting a fuse box associated with a vehicle battery.
Figure 3B:
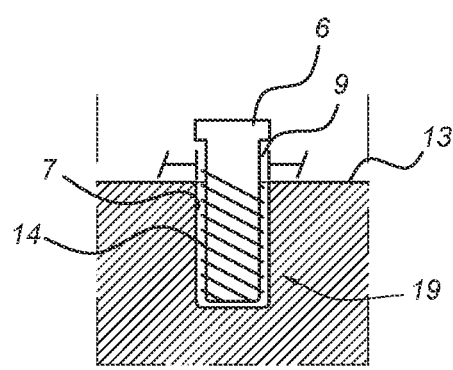

FIGS. 3a and 3b show details of a first embodiment of a method according to the disclosure for mounting a fuse box associated with a vehicle battery. Firstly, one fastening member 6 for mounting the fuse box 2 to the cover 13 is provided and shown in FIG. 3a above the blind recess 4 in the cover 13. Then, thread 7 is provided in the cover 13, here in the recess 4 of the cover 13, for providing a threaded hole 19 in the cover 13. In this case the thread is cut directly in the cover 13 for providing the threaded hole 19. Lastly, as shown in FIG. 3b, the fastening member 6 is screwed into the threaded hole 19 for providing a threaded connection between the fuse box 2 and the vehicle battery 3.

As an option, the fastening member 6 comprises cutting means 14 and the step of providing thread 7 in the cover 13 comprises performing a cutting action with the cutting means 14 of the fastening member 6. An example of a fastening member 6 comprising a thread cutting section 14, is a type PF6 screw.

Figure 4A:
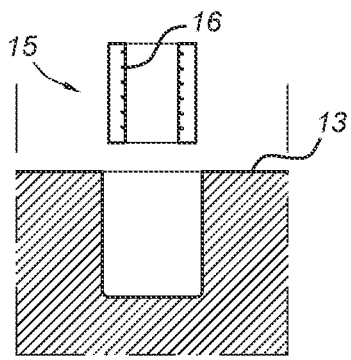
FIGS. 4A, 4B and 4C show details of a second embodiment of a method according to the disclosure for mounting a fuse box associated with a vehicle battery.
Figure 4B:
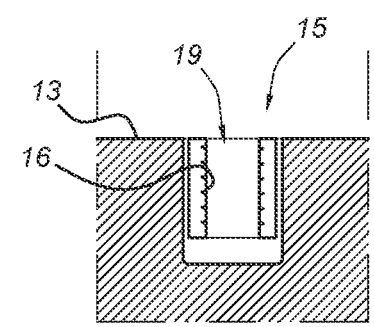
Figure 4C:
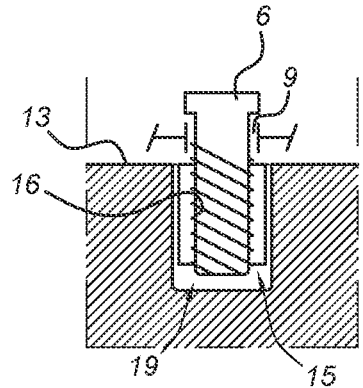

FIGS. 4a, 4b and 4c show details of a second embodiment of a method according to the disclosure for mounting a fuse box 2 associated with a vehicle battery 3. In this case, the fastening member comprising a threaded insert 15. The insert is provided with an inner thread 16. The providing thread in the cover 13 comprises arranging the threaded insert 15 in the blind recess 4 for providing the threaded hole 19 in the cover 13. Lastly, as shown in FIG. 4c, the fastening member 6 is screwed into the threaded hole 19 for providing a threaded connection between the fuse box 2 and the vehicle battery 3.

Figure 5:
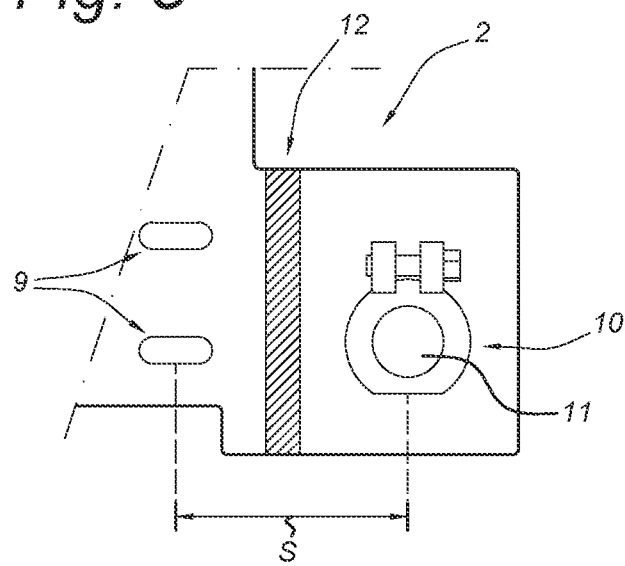
FIG. 5 shows a schematic top view of a detail of a fuse box of the disclosure.

FIG. 5 shows a schematic top view of a detail of a fuse box 2 of the disclosure. The terminal 10 initially engages the battery pole 11 with a loose fit. Then, the fastener 6 is screwed into the threaded hole 19 of the cover 13. Thereafter, the terminal 10 is clamped on the battery pole 11. The fuse box 2 comprises a resilient fuse box section 12. The fastener 6 and the terminal 10 are connected to the resilient fuse box section 12 to allow adjustment of a spacing s between the fastener 6 and the terminal 10 within an adjustment window of operation. The adjustment window of operation is determined by the resilient fuse box section 12.

What is claimed is:

1. A method for mounting a fuse box with a vehicle battery, the method comprising:
   providing a vehicle battery comprising a housing and a cover closing off an opening of the housing, wherein the cover comprises a blind recess comprising a pair of blind holes that facilitate coupling with a battery pole cover;
   providing a fastening member for mounting the fuse box to the cover;
   providing thread in the cover forming a threaded hole, wherein the providing the thread in the cover to form the threaded hole comprises cutting the thread directly in the cover to form the threaded hole;
   removing the battery pole cover from the vehicle battery before connecting the fuse box to the blind holes; and
   screwing the fastening member into the threaded hole to connect the fuse box and the vehicle battery.

2. The method of claim 1, wherein the fastening member comprises a cutting means and the cutting the thread comprises performing a cutting action with the cutting means of the fastening member to the cover.

3. The method of claim 1, further comprising:
   clamping a terminal on a battery pole.

4. The method of claim 3, further comprising:
   engaging the terminal and the battery pole with a loose fit; and
   screwing the fastening member into the threaded hole before clamping the terminal on the battery pole.

5. The method of claim 1, further comprising:
   arranging the fuse box on top of the battery wherein a projection of the fuse box is within an outline of the battery.

6. The method of claim 1, wherein the fastening member comprises a thread cutting screw.

7. The method of claim 1, wherein the vehicle battery is an H type battery.

8. The method of claim 1, wherein the fastening member is a PF6 type screw.

9. A method comprising:
   providing a vehicle battery comprising a housing and a cover closing off an opening of the housing;
   providing a fastening member for mounting a fuse box to the cover;
   providing thread in the cover forming a threaded hole; and
   screwing the fastening member into the threaded hole to connect the fuse box and the vehicle battery, the fuse box comprising:
      a means for coupling the fastening member to the fuse box, wherein the fastening member comprises a cutting means for cutting thread;
      a terminal for clamping around a battery pole; and
      a resilient fuse box section, wherein the fastening member and the terminal are connected to the resilient fuse box section to facilitate adjustment of a spacing between the fastening member and the terminal within an adjustment window of operation, and wherein the adjustment window of operation is determined by the resilient fuse box section.

10. The method of claim 9, wherein the vehicle battery is an H type battery.

11. The method of claim 9, wherein the fastening member is a PF6 type screw.

12. An assembly comprising a battery and a fuse box, the assembly comprising:
    a means for coupling a fastener to the fuse box, wherein the fastener comprises a cutting means for cutting thread; and
    a terminal for clamping around a battery pole; and
    a resilient fuse box section, wherein the fastener and the terminal are connected to the resilient fuse box section to facilitate adjustment of a spacing between the fastener and the terminal within an adjustment window of operation, and wherein the adjustment window of operation is determined by the resilient fuse box section.

13. The assembly according to claim 12, wherein the fuse box is connected to the battery through a threaded connection between a battery cover and the fuse box and a clamping action between a fuse box terminal and a battery pole.

14. The assembly according to claim 12, wherein the fuse box is arranged on top of the battery, and wherein a projection of the fuse box is within an outline of the battery.

15. The assembly of claim 12, wherein the battery is an H type battery.

16. The assembly of claim 12, wherein the fastener is a PF6 type screw.

* * * * *